United States Patent [19]

Deering

[11] 4,415,140

[45] Nov. 15, 1983

[54] NET HAULING SHEAVE DEVICE WITH TAILING PRESSURE WHEEL

[75] Inventor: Kenneth J. Deering, Seattle, Wash.

[73] Assignee: Marine Construction & Design Co., Seattle, Wash.

[21] Appl. No.: 359,215

[22] Filed: Mar. 18, 1982

[51] Int. Cl.³ .............................................. A01K 73/06
[52] U.S. Cl. .................................... 254/371; 226/183; 254/333
[58] Field of Search ............... 254/287, 333, 371, 396; 226/176, 181, 183, 188

[56] References Cited

U.S. PATENT DOCUMENTS

| 3,448,962 | 6/1969 | Miller | 254/333 X |
| 3,643,921 | 2/1972 | Puretic | 254/371 X |
| 3,791,625 | 2/1974 | Viljoen | 254/371 |

Primary Examiner—John Petrakes
Attorney, Agent, or Firm—Christensen, O'Connor, Johnson & Kindness

[57] ABSTRACT

The presser wheel support comprises a depending support arm pivotally connected to the end of a cantilevered arm projecting at a downward slope in the tailing direction from a net hauler sheave frame member preferably in the form of a transverse suspension plate overlying the net hauler sheave. A fluid operated jack interacting between the hauler sheave frame and the support arm generally in the common plane of the hauler sheave and presser wheel urges the wheel yieldably against netting descending in the main hauler sheave groove so as to increase the hauling traction and hauling force exerted on the netting to avoid slippage and damage of netting.

7 Claims, 3 Drawing Figures

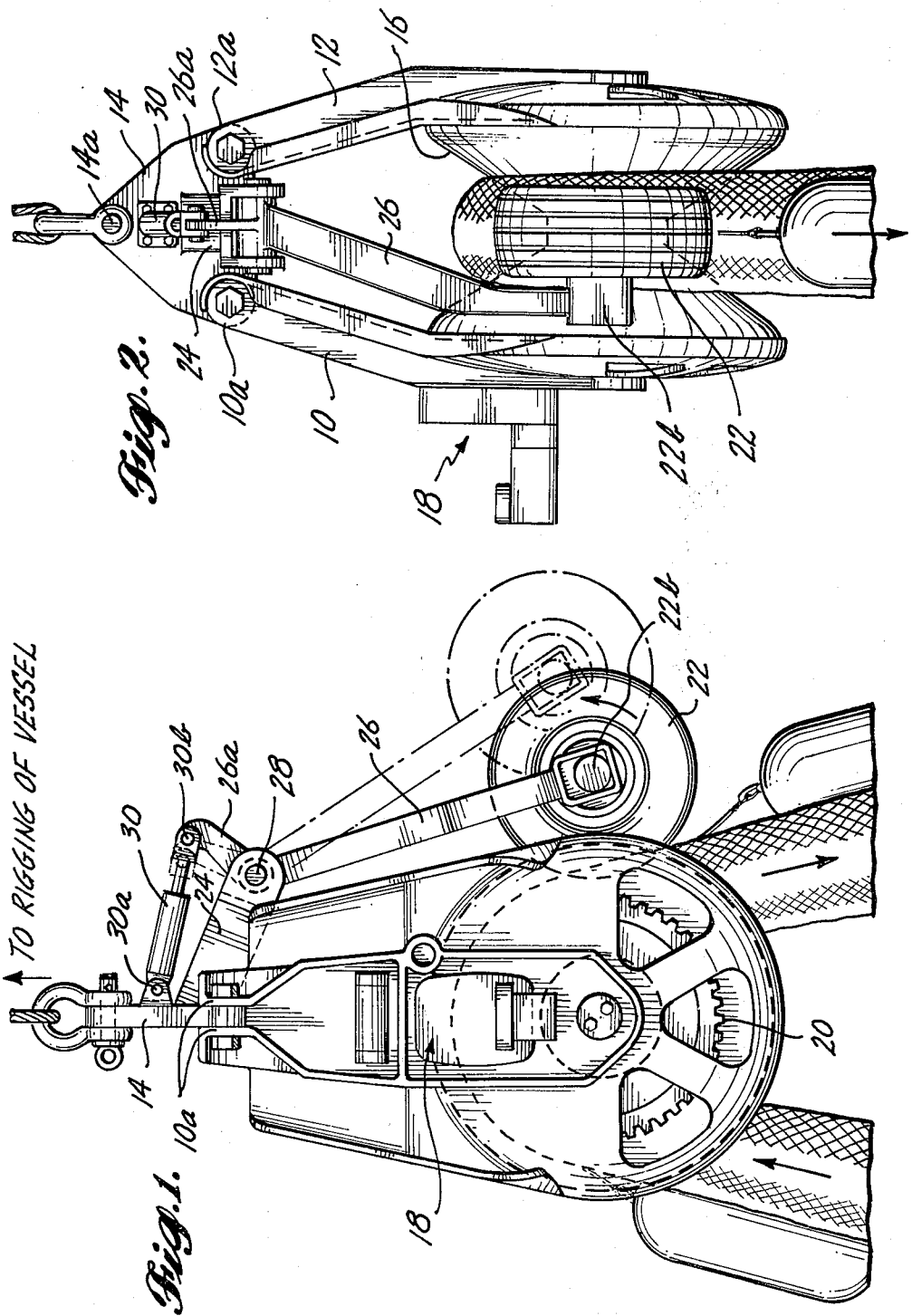

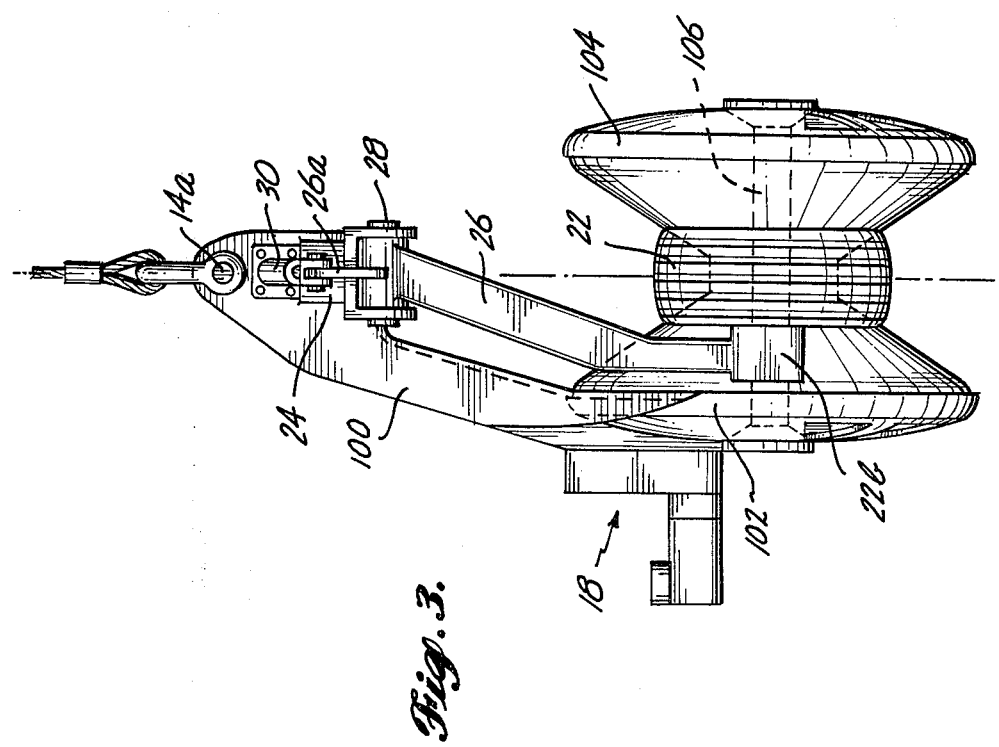

NET HAULING SHEAVE DEVICE WITH TAILING PRESSURE WHEEL

BACKGROUND OF THE INVENTION

This invention relates to improvements in net-hauling devices used aboard fishing vessels and, more particularly, to an improved device of the type disclosed in U.S. Pat. No. 3,791,625, issued Feb. 12, 1974. While the invention is disclosed in its presently preferred form, it will be appreciated that certain modifications and changes with respect to detail may be made therein without departing from the essential features involved.

In the continuing use of the prior devices of the nature described in the above-cited patent, occasional problems were experienced with tangled, lumped masses of netting including net floats failing to pass undamaged or at all through the variable gap formed between the main hauling sheave and the power-driven presser wheel on the tailing side of the hauling sheave. Wide variations in cross section of the massed netting composites passing the presser wheel in such prior devices also caused substantial impact loading of the presser wheel mount and excessive variations in the effectiveness of the presser wheel as an aid to the main hauler sheave. As a consequence, drive slippage sometimes occurred causing net damage or retarded net hauling operations; in either case, impeding the work of a busy seiner vessel. Scaling up the apparatus in size and weight to meet such occurrences was not considered practical due to the positioning requirement of suspending the same high in the rigging for most uses.

In accordance with the present invention, a power-driven net hauling sheave apparatus is provided for the pendulously suspended type having an improved presser wheel mechanism which lends itself more effectively both by spacing clearance and by path of reaction motion of the presser wheel mount, to accommodating lumped masses of netting and net components advancing for passage through the apparatus. A related, concurrent objective is to provide simplified and more effective presser wheel mounting mechanism constructed and arranged to assume and transfer the force loads including impact loads incident on the presser wheel during net hauling operations.

SUMMARY OF THE INVENTION

In the presently improved apparatus, the presser wheel is mounted on the swinging lower end of a support arm that in turn is hinged on the free end of a fixed cantilevered base arm. In the presently preferred embodiment, the base arm projects, preferably at a decline, from an overarching bridging member that joins together the main frame sides and that serves as a means by which the apparatus is suspended in elevated position from the rigging of the fishing vessel. The important geometric relationship is such that reactive displacement of the net-engaging presser wheel by varying distances from the downturning side of the main hauler sheave when accommodating passage of massed netting and floats is attended by swinging of its support arm toward alignment with the cantilevered arm to a degree related directly to the cross-sectional size of the mass impacting the presser wheel. In an embodiment wherein the frame is open at the top and the frame sides are joined together by a central shaft around which the sheave revolves, the presser wheel arm is mounted on the base arm which receives its support from the hanger arm that projects upwardly from one frame side into central position overarching the sheave groove.

With the improved geometric mounting arrangement for the presser wheel and with its cantilevered base arm mounted in transversely centered position on the bridging frame member suspension-mount, the presser wheel remains effective for its purpose in all displaced positions. Moreover, the resulting structurally favorable assumption and transfer of forces acting on the presser wheel and its mount permit the mechanical system to be of relatively lightweight, compact and durable construction.

These and other features, objects and advantages of the invention will become more fully evident from the description that follows by reference to the accompanying drawings.

BRIEF DESCRIPTION OF DRAWINGS

FIG. 1 is a side elevation and FIG. 2 is an end elevation (i.e., viewed in the plane of the hauler sheave) of the apparatus.

FIG. 3 is an end elevation of an alternative embodiment.

DETAILED DESCRIPTION REFERRING TO DRAWINGS

Referring to the drawings, in FIGS. 1 and 2 the illustrated apparatus comprises side frame members 10 and 12 spaced in parallel relationship and with upper portions converging for interconnection at their tops by a vertical, transversely extending bridging plate 14 conveniently of generally triangular configuration. Throughbolts clamp the bridging plate 14 by its lower corners between flanged ears 10a at the top of side frame member 10 and between a similar set of ears 12a at the top of side frame member 12, as illustrated. The main hauler sheave 16 is rotatively supported to turn on a horizontal axis by and between the opposite side frame members 10 and 12. Frame side member 10 mounts a suitable hydraulic drive motor coupled to the sheave 16 through a gear train including the ring gear 20 mounted on the adjacent side of the sheave 16. Details of the sheave, drive train and hydraulic power drive system with its controls are or may be conventional and, therefore, require no specific description or more elaborate illustration herein.

Main hauler sheave 16 is or may be of conventional configuration as well. It preferably is of deeply reentrant V-groove configuration with its groove surfaces radially cleated and rubber clad for traction purposes. The mesh of an elongated seine net or gill net draped over the sheave press against and into the soft elastomeric surfaces of the sheave groove by reason of shear weight of the net assembly aided by the presser wheel, as will be described, such that driven rotation of the sheave causes the net to advance upwardly to, over and downwardly from the sheave. Thus, with the block suspended above deck from the rigging of the fishing vessel by means of a suitable coupling with the frame's bridging plate 14, the net may be progressively raised from the water and deposited on deck, and vice-versa. Details of such mountings and of the form and operation of the power-driven hauler sheave in general are or may be of conventional design.

It is also known from prior art practices, including the disclosure in U.S. Pat. No. 3,791,625, cited above, that net slippage on the groove surfaces of the main hauler sheave can be reduced to an insignificant level in most situations by assuring that the wrap angle of the net around the sheave groove is not greatly less than 180 degrees and by pressing the net wedgingly into the sheave groove and against the groove surfaces on the tailing or downturning side of the main hauler sheave. Still additional augmentation of net traction pressure and wrap angle, together with powered net hauling force applied to the net, is achieved by employing a presser wheel which itself is power driven conjointly with the drive of the hauler sheave itself. That basic combination is also disclosed in said prior patent.

In accordance with the disclosed preferred embodiment of the present invention, power-driven rubber-tired presser wheel 22 is mounted and remains with its center plane of rotation substantially coincident with the central plane of rotation of the main hauler sheave. The improved support for the presser wheel comprises a cantilevered base arm 24 welded or otherwise rigidly secured at one end to the bridging plate 14 and projecting generally horizontally but preferably at a decline therefrom in the tailing direction of rotation of the hauler sheave 16. A presser wheel support arm 26 is hingedly mounted in depending position on the free end of the cantilevered arm 24 by means of a transverse pivot pin 28. Arm 24 with pivot 28 is located sufficiently above the channel space in the hauler sheave 16 to clear the incoming masses of netting with floats passing over the hauler sheave. The spacings are such that with the wheel rolling against a normal amount of netting passing through and over the hauler sheave groove, arm 26 preferably angles away from the vertical outwardly from the power sheave. That angle is increased and the arm 26 moves closer to alignment with the cantilevered arm 24 as cross-sectionally increasingly larger masses of netting and netting components pass between the presser wheel and the hauler sheave. A hydraulic drive motor 22b mounted on the lower end of arm 26 is drivingly connected to the presser wheel 22 and, by means of hydraulic lines, extends to the same source of hydraulic drive pressure (not shown) as that serving the drive motor unit 18 for the main hauler sheave.

The pivotally mounted upper end of the depending support arm 26 has an upwardly and outwardly angled crank arm extension 26a continuing beyond the pivot pin 28 so as to form a bell crank. A hydraulic piston-and-cylinder jack 30 extending lengthwise of and along the top side of cantilever arm 24 is connected at one end 30a to the bridging plate 14 and at its opposite end 30b to the crank arm 26a. Through suitable controls (not shown) and a source of hydraulic pressure (not shown), operation of the hydraulic jack 30 in contraction swings the presser wheel away from the net in the hauler sheave while its operation in extension presses the wheel firmly against the net in the hauler sheave and presses the latter as a mass into the main hauler sheave groove for traction-increasing purposes. While the hydraulic system working the jack 30 permits it to yield in order to pass lumped masses of netting, the pressure is held steady in all positions using conventional hydraulic circuit and excess pressure relief reservoir design. Moreover, the mount is such that as the presser wheel is moved in an outward and upward arc of displacement to accommodate larger and larger masses of netting, its force directed against the net remains generally radial to the main hauler sheave.

In the latter regard, it will be noted that the slope and limited length of the cantilevered arm while providing the desired normalcy to the arc of the presser wheel displacement motion, also achieves structurally favorable transfer of presser wheel load impact forces to the bridging plate 14 by way of cantilevered arm 24. Instead of imposing excessive bending leverage on the cantilevered arm, the latter is loaded largely in tension. The described direct and structurally efficient manner of assuming and transmitting presser wheel mount force loads permit the overall bulk and weight of the device to be minimized.

In FIG. 3 certain parts which correspond to or are functionally similar to those in FIGS. 1 and 2 bear the same reference numerals. In this embodiment, based on what is sometimes referred to as a "snatch block", base arm 24 and actuator cylinder 30 are mounted on the upper end of the main block hanger arm 100 that projects upwardly from one frame side 102 and inwardly to the mid-plane so as to partially overarch the space above hauler sheave 16. The opposite frame side 104, serving with the first as a net guide, is rigidly positioned in relation to the first side 102 by a fixed connection to a non-rotative central shelf 106 connecting the sides together. Hauler sheave 16 is mounted on bearings (not shown) for driven rotation about shaft 106. Net to be hauled may be moved laterally through the open gap 108 between hanger arm 100 and the upper end of frame side 104 into and from the sheave groove in the manner of conventional snatch block usage. However, the mounting location and functional geometry of presser wheel arm 26 and its associated actuator mechanism are substantially as in the preceding embodiment wherein the presser wheel arm 26 is also mounted dependingly on the end of an overlying central frame arm that projects from a frame location adjacent the block's frame suspension point in a tailing direction so as to position the presser arm pivot at an elevated point substantially in the plane of the presser wheel and generally in vertical alignment with the column of netting descending from the sheave 16.

While having described the invention it its preferred form, it will be appreciated that the claims that follow are also intended to cover a reasonable range of equivalents within the scope and spirit of the advancement in the art thus provided.

The embodiments of the invention in which an exclusive property or privilege is claimed are defined as follows:

1. Net hauling apparatus comprising a power-driven hauler sheave having an annular net-engaging groove therein, a support frame for said sheave comprising upright side members with means for rotatively supporting and driving said sheave on a generally horizontal axis between said side members, said frame further including means rigidly interconnecting said side members and further including hanger means on said frame having a substantially transversely central suspension means for pendulously suspending the apparatus by said hanger means, with clearance space provided beneath said hanger means for passage of a fishing net draped over the sheave and being advanced progressively upwardly to, over and downwardly from the sheave, said hanger means including a pivot mount substantially centered in the rotational plane of the hauler sheave at a location generally above the downturning side of the hauler sheave, a presser wheel formed to press the fishing net into the sheave groove in aid of net advancement by the sheave, and a generally upright presser wheel support arm hingedly secured at its upper end to said pivot mount and carrying said presser wheel at its lower end in position to press the net into the sheave groove in a generally horizontal direction radially inwardly of the sheave on the dowturning side thereof, and force applying means interacting between said frame and said support arm yieldably urging said presser wheel against the net and thereby the net into the sheave groove.

2. The apparatus defined in claim 1 wherein the hanger means includes a cantilevered base arm projecting in the tailing direction at a downward slope from said hanger means.

3. The apparatus defined in claim 2 wherein the presser wheel is power driven.

4. The apparatus defined in claim 2 wherein the presser wheel is power driven, and wherein the force applying means comprises a piston-and-cylinder fluid actuated jack connected at one end to the frame and extending generally lengthwise of the cantilevered base arm, and wherein the support arm has a crank extension to which the jack is connected by its other end to actuate the presser wheel yieldably against netting descending from the hauler sheave.

5. The apparatus defined in claim 2 wherein the presser wheel is power driven, and wherein the force applying means comprises a piston-and-cylinder fluid actuated jack connected at one end to the cantilevered arm and mounted on and extending lengthwise of such arm, and wherein the support arm carries a crank member rigid therewith offset from the support arm hinged connection and to which the jack is connected.

6. Net hauling apparatus comprising a power-driven hauler sheave having an annular net-engaging groove therein, a support frame for said sheave comprising upright side members with means for rotatively supporting and driving said sheave on a generally horizontal axis between said side members, said frame further including a bridging connection between said side members and hanger means for pendulously suspending the apparatus by said hanger means from a location spaced generally centrally above said sheave, with clearance space provided beneath said hanger means for passage of a fishing net draped over the sheave and being advanced progressively upwardly to, over and downwardly from the sheave, said frame further including a hinging pivot lying generally above the downturning side of the sheave groove while maintaining clearance space between said frame means and the sheave for net passage, a presser wheel formed to press the fishing net into the sheave groove in aid of net advancement by the sheave, and means supporting said presser wheel comprising a support arm hingedly mounted in depending position from said frame means hinging pivot and carrying said presser wheel in position to press the net into the sheave groove on the downturning side thereof, and force applying means interacting between said frame and said support arm, yieldably urging said presser wheel against the net and thereby the net into the sheave groove.

7. The apparatus defined in claim 6 wherein the location of the hinging pivot and the length of the support arm is related thereto such that the presser wheel yields first generally horizontally away from the hauler sheave and then horizontally and upwardly at a slope that increases as the support arm swings toward coalignment with the cantilvered arm.

* * * * *